Feb. 23, 1971           H. FISCHER          3,564,908
MICRO HARDNESS TESTER ATTACHABLE TO MICROSCOPES
Filed May 27, 1968
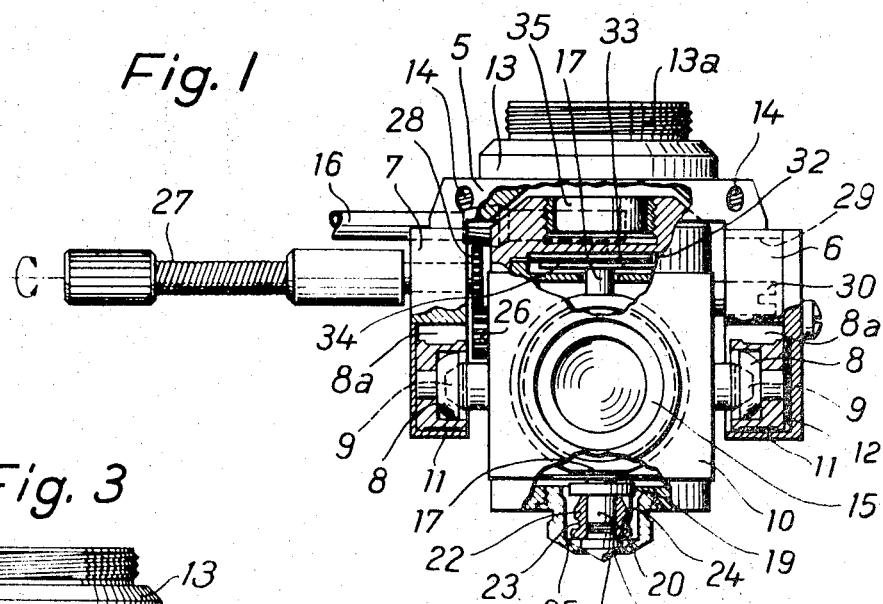
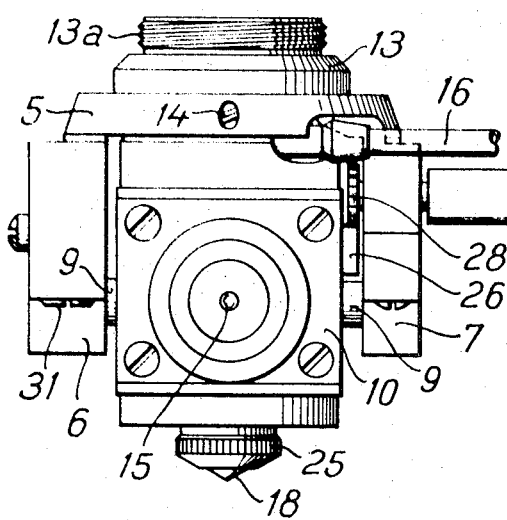
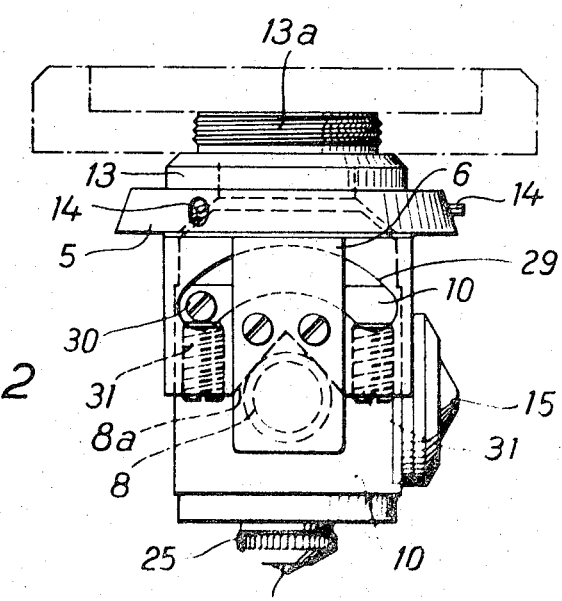
INVENTOR
Hugo Fischer
BY
Krafft & Wells
ATTORNEYS United States Patent Office 3,564,908
Patented Feb. 23, 1971

3,564,908
MICRO HARDNESS TESTER ATTACHABLE TO MICROSCOPES
Hugo Fischer, Wetzlar, Germany, assignor to Ernst Leitz GmbH, Wetzlar, Germany
Filed May 27, 1968, Ser. No. 732,388
Claims priority, application Germany, June 3, 1967, L 56,654
Int. Cl. G01n 3/42
U.S. Cl. 73—81                              6 Claims

ABSTRACT OF THE DISCLOSURE

A support member is provided having means for attaching said member to a microscope in the place of an objective. A solid body is pivotably supported by said member, into said body being mounted the objective and an indentor with their axes extending at an angle to each other. Means are provided for pivoting said body through said angle so as to align either the objective axis or the indentor axis with the optical axis of the microscope, and further means are provided adapted to displace said indentor along its axis so as to produce an indentation in the surface of a specimen to be tested.

CROSS-REFERENCE TO RELATED APPLICATIONS

Applicant claims priority under 35 USC 119 for application L 56654 IXb/42k, filed June 3, 1967 in the Patent Office of the Federal Republic of Germany.

Reference is further made to U.S. Pats. No. 2,305,760 and No. 2,216,943.

BACKGROUND OF THE INVENTION

(1) Field of the invention

The invention relates to an apparatus for measuring the hardness of materials by indentation, which apparatus is intended for use in conjunction with a microscope.

(2) Description of the prior art

Micro hardness testers which are to be used in combination with a microscope are already known to those skilled in this particular art. In U.S. Pat. No. 2,305,760, for example, is disclosed an embodiment wherein the indentation body is arranged on the front lens of the microscope objective. When the objective is lowered this indentor leaves an impression on the material to be tested, which impression is later observed through the objective.

U.S. Pat. No. 2,216,943, on the other hand, shows the indentor to be arranged on a glass plate in front of the objective front lens.

With these known devices it is a disadvantage, however, that the indentor reduces the aperture of the objective, thereby causing a noticeable decrease in image quality. Further, the objectives must be of considerable long focal length because observation of the impression must be possible when the indentor is withdrawn from the impression. These working conditions require special objectives having only a reduced resolving power. It is therefore an object of the invention to provide a micro hardness tested than can be attached to a microscope which overcomes the above mentioned drawbacks. It is a particular object of the invention to provide a tester wherein a regular objective is incorporated and wherein the indentor does not reduce the aperture of the objective.

SUMMARY OF THE INVENTION

These objects are attained by arranging an objective and an indentor together within a solid body in such a way that the optical axis of the objective and the direction of displacement of the indentor extend at an angle to each other. A support member is attached to the microscope in the place of the objective so that said solid body is piviotable through said angle so that either the objective or the indentor can be brought into alignment with the optical axis of the microscope. The idea underlying the invention is first to bring the objective into alignment with the microscope axis and to select a spot on the specimen to be tested. The solid body is then pivoted so as to bring the indentor in its working position, then the indentor is displaced, for example by pneumatically operated means and pressed against the material to be tested so as to produce an impression thereon. Thereafter, the solid body is pivoted through 90°, thereby bringing the objective into alignment with the microscope axis so that now the impression can be observed through the ocular and the objective.

DESCRIPTION OF THE DRAWINGS

The invention will be more fully comprehended from the following description when taken in conjunction with the appending drawings wherein FIG. 1 is a front view of the hardness tester with the indentor being in alignment with the optical axis of the microscope, FIG. 2 is a side view, and FIG. 3 is a rear view of the same device.

To a carrier ring 5 are secured two support arms 6, 7. In these two arms are journalled two shaft ends 9 by means of two separable ball bearings 8. The shaft ends 9 are rigidly connected to opposite sides of a cubic body 10, thereby rendering the body pivotable relative to said support arms 6, 7.

The ball bearings rest in prismatic bearings 8a wherein they are kept by springs 11. Additionally, a spring 12 mounted in arms 6 exerts a force on the adjacent bearing 8 in axial direction of shaft 9 so as always to ensure a positive abutment of the bearing 8 in arm 7 against the wall of the latter.

In the carrier ring 5 is further loosely mounted a ring 13 so as to be laterally displaceable in all directions. Two set screws 14 are provided in ring 5 which act upon ring 13 and are suitable for adjusting the position of carrier ring 5 relative to ring 13 and for positively securing the adjusted position. A threaded portion 13a extends out of carrier ring 5 by which portion the whole device is threaded into the microscope in the place of the microscope objective. Along one side of the objective there is arranged a pressure chamber 32 which is covered by a membrane 34. A pipe socket 16 and a flexible tube (not shown) connect the pressure chamber to a compressed air source.

A push rod 17 abuts against the membrane 34. The rod is suspended by a pressure plate 33 and carries at its opposite end the indentor 18.

The push rod 17 extends normal to the axis of objective 15 and the axis of said rod intersects the objective axis. However, the middle portion of push rod 17 is ring-shaped so as not to interfere with the light bundle passing through the objective.

The free end of push rod 17 carries a plate 19 wherein a pin 20 is inserted. The indentor 18 together with its mount 21 is secured to a cap 22 which is slipped on pin 20. Mount 21 is provided with a groove 23 along its circumference. Leaf springs 24 which are fastened to plate 19 contact the cap 22 in the groove 23 and keep the cap 22 safely on the pin. This arrangement is covered by a threaded protection cap 25.

On one side the body 10 is provided with a toothed segment 26 which is in mesh with a spur gear 28 at the end of the flexible shaft 27 journalled in support arm 7. The support arm 6 has a circular oblong hole 29. A pin 30 is rigidly fastened to the body 10 and glides in the oblong hole 29 whenever body 10 is pivoted. Permanent magnets 31 are threaded into the arm 6 at both ends of hole 29 and serve as adjustable abutments for pin 30 in the two working positions. At the same time the magnets provide a kind of detent keeping the pin in the working position. Pin 30, therefore, is made from a magnetizable material.

After threading the apparatus into the objective thread of the microscope and after the pressure air source is connected to the pressure chamber the hardness tester is ready for use. By pivoting the flexible shaft, i.e. by pivoting body 10, the objective 15 is brought into alignment with the optical axis of the microscope and the portion to be tested of the material is selected. Then, by pivoting the flexible shaft in opposite direction the indentor is brought into its working position. Compressed air is then conducted into the pressure chamber whereby the membrane is displaced outwardly which causes the indentor to penetrate into the material to be tested.

After the compressed air is released from the chamber 32 the indentor 18 together with push rod 17 return to their original position owing to the resilient effect of pressure plate 33, which return movement, however, is further supported by a magnet 35. The latter being inserted into the body 10 opposite to the end of push rod 17 and membrane 34.

The body 10 is then again pivoted, thereby switching over to objective 15 by means of which objective and the ocular the impression is now measured.

Exchange of the indentor 18 is performed by first taking off the protection cap 25 whereby cap 22 becomes accessible. By grasping the groove 23 the cap can then be pulled off together with the indentor 18.

This method of exchange of the indentor is of particular advantage when impressions of various shapes are to be produced in the same material to be tested.

With the above described micro hardness tester it is of particular advantage that it can be attached to any ordinary microscope without interfering with the other objectives of different focal length which are also threaded into the nose piece, thus rendering the ordinary microscope usable also for hardness tests. As has been proven the tester is of considerable exactness in operation which makes it possible to view the impression either by means of the objective incorporated into the body of the tester or by any other objective mounted in the nose piece.

What I claim is:

1. A micro hardness tester attachable to a microscope comprising a body containing an objective and an indenting means, said objective being positioned in the body relative to the indenting means so that the axis of the objective intersects the axis of the indenting means at a fixed angle, support means pivotally supporting said body and including a carrier ring attachable to a microscope in place of the objective and having a pair of depending arms pivotally supporting said body therebetween, and positioning means carried by said support means and operable to selectively pivot said body through said fixed angle between the axis of the objective and the axis of the indenting means, and means adapted to displace said indenting means along its axis to produce an indentation in a test specimen.

2. A micro hardness tester according to claim 1, wherein said angle between said objective axis and said indentor axis is 90 degrees.

3. A micro hardness tester according to claim 1, and further comprising adjustable abutting elements for limiting the pivoting motion to exactly the angle between the objective axis and the indentor axis.

4. A micro hardness tester according to claim 3, wherein said abutting elements consist of two permanent magnets.

5. A micro hardness tester attachable to a microscope comprising a body containing an objective and an indenting means, said objective being positioned in the body relative to the indenting means so that the axis of the objective intersects the axis of the indenting means at a fixed angle, a carrier ring attachable to a microscope in place of the objective and having a pair of depending arms pivotally supporting said body therebetween, positioning means coordinated with said body and including a toothed segment fixed to said body, a spur gear in mesh with said toothed segment, a shaft rotatably mounted in a fixed point outside said body and fixed to said spur gear so that rotation of said shaft will change the position of said body by means of said toothed segment, actuating means for displacing said indenting means in the direction of its axis located in said body adjacent the objective and including a push rod having a circular open central portion positioned relative to the axis of the objective to permit the transmission of light rays therealong without interference, a pressure chamber located adjacent the objective and including a movable membrane, a pressure plate in contact with the movable membrane and fixed to the push rod, and means for conducting compressed air into said pressure chamber to move said membrane.

6. A micro hardness tester according to claim 5, including a permanent magnet mounted in said body opposite the movable membrane of the pressure chamber and adapted to support the return movement of the pressure plate.

References Cited

UNITED STATES PATENTS

| 2,188,992 | 2/1940 | Wolpert | 73—81 |
| 2,355,411 | 8/1944 | Bernhardt | 73—81 |
| 2,550,775 | 5/1951 | Clark | 73—85UX |
| 3,120,753 | 2/1964 | Green | 73—81 |

FOREIGN PATENTS

| 499,890 | 1/1939 | Great Britain | 73—81 |

RICHARD C. QUEISSER, Primary Examiner

C. E. SNEE III, Assistant Examiner